US012451612B2

(12) United States Patent
Khattak et al.

(10) Patent No.: US 12,451,612 B2
(45) Date of Patent: Oct. 21, 2025

(54) METASURFACE SUPERSTRATE (MSS) ENABLED RADIATOR FOR A MULTIBAND ANTENNA APPARATUS

(71) Applicant: HUAWEI TECHNOLOGIES CO., LTD., Guangdong (CN)

(72) Inventors: Muhammad Kamran Khattak, Munich (DE); Bruno Biscontini, Munich (DE); Juan Segador Alvarez, Munich (DE); Zhi Gong, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 182 days.

(21) Appl. No.: 18/301,562

(22) Filed: Apr. 17, 2023

(65) Prior Publication Data

US 2023/0261387 A1 Aug. 17, 2023

Related U.S. Application Data

(63) Continuation of application No. PCT/EP2020/082223, filed on Nov. 16, 2020.

(51) Int. Cl.
*H01Q 15/00* (2006.01)
*H01Q 21/06* (2006.01)

(52) U.S. Cl.
CPC ....... *H01Q 15/0086* (2013.01); *H01Q 21/065* (2013.01)

(58) Field of Classification Search
CPC .... H01Q 15/0086; H01Q 21/065; H01Q 5/40; H01Q 15/0013; H01Q 19/108; H01Q 21/28; H01Q 1/246
See application file for complete search history.

(56) References Cited

U.S. PATENT DOCUMENTS

2011/0128202 A1 6/2011 Ju
2016/0156105 A1 6/2016 Buckley
(Continued)

FOREIGN PATENT DOCUMENTS

CN 103259087 A * 8/2013
CN 104934716 A * 9/2015

OTHER PUBLICATIONS

Teruel et al., "Roadmap on metasurfaces," Journal of Optics, Jul. 2019, 46 pages.
(Continued)

*Primary Examiner* — Dieu Hien T Duong
(74) *Attorney, Agent, or Firm* — Fish & Richardson P.C.

(57) ABSTRACT

The present disclosure relates to multiband antenna apparatuses. An example multiband antenna apparatus includes a first dipole radiating element, a second radiating element, and a metasurface superstrate (MSS) structure. The first dipole radiating element may be configured to operate at a first frequency band and arranged on an upper plane of a support structure in a first distance to a reflector plate. The second radiating element may be configured to operate at a second frequency band and arranged on a lower plane of the support structure in a second distance to the reflector plate. The second distance is smaller than the first distance. The second frequency band is higher than the first frequency band. The MSS structure is arranged in an area inside arms of the first dipole radiating element and enhances a performance of the second radiating element.

20 Claims, 7 Drawing Sheets

(56) References Cited

U.S. PATENT DOCUMENTS

| | | | | |
|---|---|---|---|---|
| 2018/0090851 | A1 | 3/2018 | Feldman et al. | |
| 2020/0021010 | A1 | 1/2020 | Ou et al. | |
| 2020/0321700 | A1 * | 10/2020 | Wu | H01Q 19/10 |
| 2021/0391657 | A1 * | 12/2021 | Chen | H01Q 21/26 |

OTHER PUBLICATIONS

Vaid et al., "High gain planar resonant cavity antennas based on metamaterial and frequency selective surfaces," International Journal of Electronics and Communications(AEÜ), May 2015, 6 pages.
Yang et al., "Compact High-Gain Metasurface Antenna Arrays Based on Higher-Mode SIW Cavities," IEEE Transactions on Antennas and Propagation, vol. 66, No. 9, Sep. 2018, 6 pages.
Trentini, "Partially Reflecting Sheet Arrays," IRE Transactions on Antennas and Propagation, vol. 4, Issue 4, Oct. 1956, 6 pages.
Balanis, "Antenna Theory Analysis and Design Third Edition," a John Wiley and Sons, Inc., Publication, 2005, 1072 pages.
International Search Report and Written Opinion in International Appln. No. PCT/CN2020/082223, mailed on Jul. 19, 2021, 11 pages.

* cited by examiner

| FREQUENCY | 3dB |
|---|---|
| 3.3GHz | 64.4745 |
| 3.4GHz | 72.4938 |
| 3.5GHz | 88.9285 |
| 3.6GHz | 98.9936 |
| 3.7GHz | 85.6305 |
| 3.8GHz | 69.2343 |
| 3.9GHz | 55.5822 |
| 4.0GHz | 46.9039 |
| 4.1GHz | 42.6236 |
| 4.2GHz | 40.7653 |

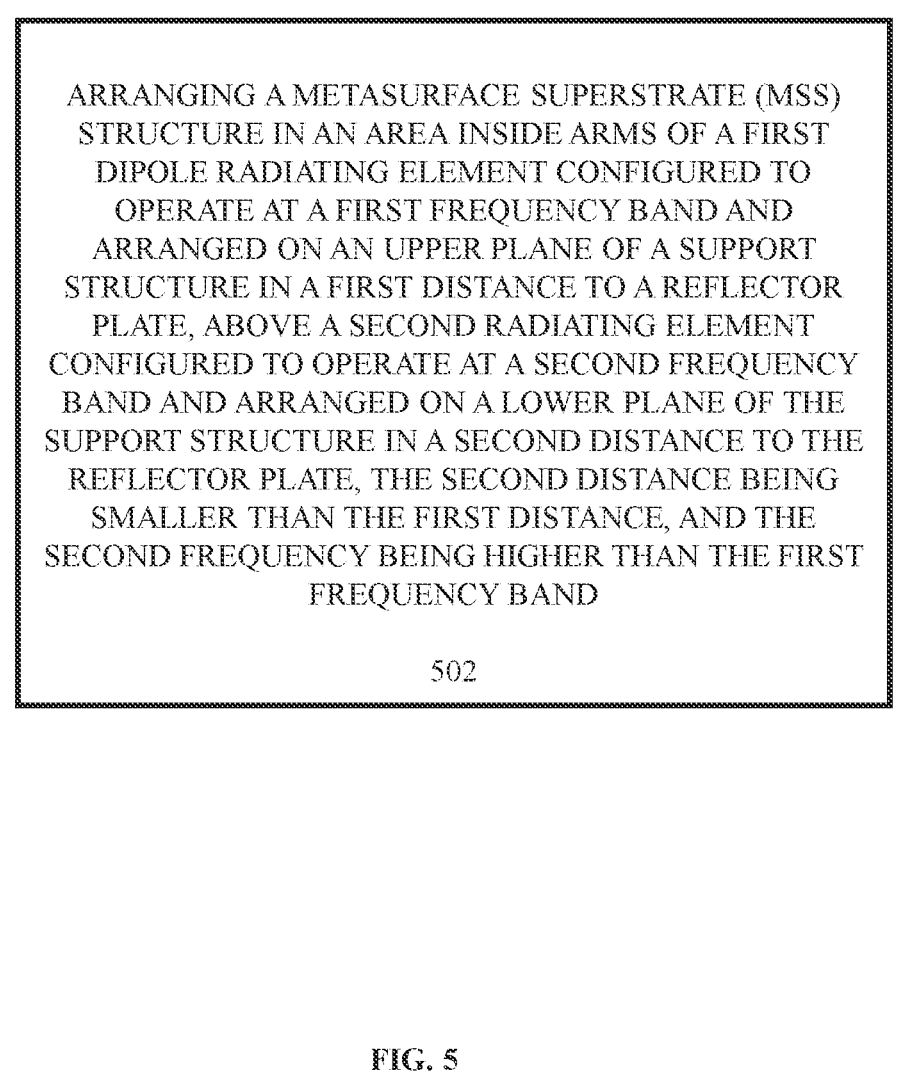

ARRANGING A METASURFACE SUPERSTRATE (MSS) STRUCTURE IN AN AREA INSIDE ARMS OF A FIRST DIPOLE RADIATING ELEMENT CONFIGURED TO OPERATE AT A FIRST FREQUENCY BAND AND ARRANGED ON AN UPPER PLANE OF A SUPPORT STRUCTURE IN A FIRST DISTANCE TO A REFLECTOR PLATE, ABOVE A SECOND RADIATING ELEMENT CONFIGURED TO OPERATE AT A SECOND FREQUENCY BAND AND ARRANGED ON A LOWER PLANE OF THE SUPPORT STRUCTURE IN A SECOND DISTANCE TO THE REFLECTOR PLATE, THE SECOND DISTANCE BEING SMALLER THAN THE FIRST DISTANCE, AND THE SECOND FREQUENCY BEING HIGHER THAN THE FIRST FREQUENCY BAND

502

FIG. 5

METASURFACE SUPERSTRATE (MSS) ENABLED RADIATOR FOR A MULTIBAND ANTENNA APPARATUS

CROSS-REFERENCE TO RELATED APPLICATIONS

This application is a continuation of International Application No. PCT/EP2020/082223, filed on Nov. 16, 2020, the disclosure of which is hereby incorporated by reference in its entirety.

TECHNICAL FIELD

The present disclosure relates to communication technologies, and more particularly the present disclosure relates to a multiband antenna apparatus with a metasurface superstrate (MSS) enabled radiator to achieve higher directivity and gain. Moreover, the present disclosure also relates to a method of producing a multiband antenna apparatus.

BACKGROUND

Modern mobile communication networks typically use frequency bands that are licensed by network providers for data communication. The mobile communication networks include several base station (BTS) antennas. The BTS antenna includes an antenna body and a radome which is a top cover of the BTS antenna. The radome protects the BTS antenna from severe weather conditions. The antenna body includes antenna radiators to radiate enough power at higher elevation angles for data transmission. The various key performance indicators (KPIs) of the antenna body (i.e. directivity, gain, front-to-back (FBR) ratio, effective isotropic radiated power (EIRP), etc.) play a major role to evaluate a performance of the BTS antenna. The design of the antenna radiators also plays a major role in improving KPIs of the antenna body.

Existing approaches are focused on developing the antenna radiators with improved form factors, designs, dimensions, etc. But each material that is used for designing the antenna radiators has its limitations naturally and scientifically. Eventually, the antenna radiators developed by the existing approaches are trying to extract maximum KPIs. To extract maximum KPIs, the existing approaches are mainly focused on the design of the antenna radiators.

While designing the antenna radiators, the improvement in BTS antenna directivity and gain becomes very important. It is dependent on many parameters including a size of an antenna aperture and an area where the antenna radiators illuminate. Since the size of the BTS antenna is standard and limited, an aperture size cannot be increased with traditional approaches. The idea of placing directors and superstrates perpendicular to the antenna radiators can also improve the directivity of the antenna radiator. However, historically superstrates come with added layers of dielectric sheets which can drastically increase the weight of the BTS antenna. Another issue with the superstrate is its effectiveness in a multiband environment as the superstrate is helpful for one band and degrades the performance of another band. In existing systems, a main antenna radiator and the metasurfaces are perpendicular to each other which forms a cavity. Further, the metasurfaces include layers of dielectric sheets. Hence, the BTS antenna structure becomes a bulky due to arrangement of the main antenna radiator, the metasurfaces, and its multiple layers. Also, the BTS antenna structure is confined to a narrow band. Further, existing antenna radiators produce narrow Gaussian beams through flat lenses using surface waves through a guided medium. Though the design of the existing systems improves the KPIs of the antenna, still it is not suitable for the base station antennas due to the complexity, size, and band-limitation, etc.

Therefore, there arises a need to address the aforementioned technical drawbacks in existing technologies that are used for producing antenna.

SUMMARY

It is an object of the present disclosure to provide an approach to improve directivity and gain of a multiband antenna apparatus which is cost-effective and also easy to implement.

This object is achieved by the features of the independent claims. Further implementation forms are apparent from the dependent claims, the description, and the figures.

The present disclosure provides a multiband antenna apparatus and a method for producing the multiband antenna apparatus to achieve higher directivity and gain.

According to a first aspect, there is provided a multiband antenna apparatus. The multiband antenna apparatus includes a first dipole radiating element, a second radiating element, and a metasurface superstrate (MSS) structure. The first dipole radiating element is configured to operate at a first frequency band and is arranged on an upper plane of a support structure in a first distance to a reflector plate. The second radiating element is configured to operate at a second frequency band and is arranged on a lower plane of the support structure in a second distance to the reflector plate. The second distance is smaller than the first distance. The second frequency band is higher than the first frequency band. The MSS structure is arranged in an area inside arms of the first dipole radiating element. The MSS structure is configured to enhance a performance of the second radiating element.

The MSS structure that is arranged in the area inside the arms of the first dipole radiating element increases the directivity of the second radiating element without lowering performance parameters such as gain, radiation pattern, bandwidth, etc. of the first dipole radiating element. Further, the multiband antenna apparatus effectively utilizes an area between the first dipole radiating element and the second radiating element. Further, the performance parameters of the first dipole radiating element are not degraded as the MSS structure is arranged in the area inside the arms of the first dipole radiating element. The MSS structure may include one or more unit cells that are tuneable, thereby improving the directivity and the gain of the multiband antenna apparatus and enabling the multiband antenna apparatus to operate in a wide range of frequency bands. Design parameters of the multiband antenna apparatus such as inter-band isolation, sidelobe levels, a return-loss, and an intra-column coupling are improved by tuning a length, a width, a height, and a gap between the one or more unit cells of the MSS structure. An impedance of a surface of the MSS structure is also optimized by tuning the length, the width, the height, and the gap between the unit cells of the MSS structure. The multiband antenna apparatus with the MSS structure is advantageous due to its compact size. Also, the multiband antenna apparatus according to the first aspect is cost-effective.

In a first possible implementation form of the multiband antenna apparatus of the first aspect, the MSS structure is arranged on the upper plane of the support structure. The arrangement of the MSS structure on the upper plane of the support structure utilizes the area available in the arms of the first dipole radiating element. Also, an area between the first dipole radiating element and the second radiating element is effectively utilized by the multiband antenna apparatus to improve the performance of the multiband antenna apparatus.

In a second possible implementation of the first aspect as such or according to the first implementation form of the first aspect, the MSS structure includes metallic patches of a square shape.

In a third possible implementation of the first aspect as such or according to any of the preceding implementation forms of the first aspect, the MSS structure includes metallic patches of a cross shape. A shape of the metallic patches can be varied to achieve the enhanced performance of the multiband antenna apparatus. The shape of the metallic patches is optimized to a square shape or to a cross shape. The metallic patches that are optimized are arranged in the area of the arms of the first dipole radiating element to improve the performance of the multiband antenna apparatus.

In a fourth possible implementation of the first aspect as such or according to any of the preceding implementation forms of the first aspect, the MSS structure includes multiple layers. The multiple layers of the MSS structure support a multiband environment to enable the multiband antenna apparatus to operate over a wide range of frequency bands.

In a fifth possible implementation form of the fourth implementation form of the first aspect, the MSS structure includes a layer arranged on an upper surface of the upper plane of the support structure.

In a sixth possible implementation of the fourth implementation form of the first aspect or the fifth implementation form of the first aspect, the MSS structure includes a layer arranged on a lower surface of the upper plane of the support structure. The multiple layers of the MSS structure don't affect the weight or architecture of the multiband antenna apparatus. Thus, a size of the multiband antenna apparatus is compact and remains the same even with the multiple layers of the MSS structure.

In a seventh possible implementation form of the first aspect as such or according to any of the preceding implementation forms of the first aspect, the multiband antenna apparatus further includes a third radiating element. The third radiating element is configured to operate at a third frequency band and is arranged in a third distance to the reflector plate. The third distance is smaller than the second distance. The third frequency band is higher than the second frequency band. The MSS structure is further configured to enhance a performance of the third radiating element.

The third radiating element located at the third distance from the reflector plate and the second radiating element located at the second distance from the reflector plate optimize a shape of the MSS structure in two bands separately. The arrangement of the third radiating element along with the first dipole radiating element and the second radiating element forms a triple-band antenna apparatus. The shape of the MSS structure that is optimized provides a multiband environment to the multiband antenna apparatus to enable the multiband antenna apparatus to operate in a wide range of frequency bands. Further, the third radiating element that is arranged below the first dipole radiating element acts as a resonance cavity. As a result, a phase of the reflection coefficient of the third radiating element is at zero-degree phase with respect to the first dipole radiating element, which enables the MSS structure to radiate in-phase through the area of the arms of the first dipole radiating element. Due to the in-phase radiation from the MSS structure, a narrower beam is resulted for the third radiating element or the second radiating element. Thus, the directivity and the gain of the multiband antenna apparatus are enhanced with the narrower beam.

In an eighth possible implementation of the seventh implementation form of the first aspect, the MSS structure includes patches of different sizes in different areas inside arms of the first dipole radiating element.

The patches of the different sizes are optimized by arranging the MSS structure in different areas that include (i) an area inside the arms of the first dipole radiating element, and (ii) areas between the third radiating element, the first dipole radiating element and the second radiating element, to improve the gain and the directivity of the multiband antenna apparatus over a wide range of frequencies from 2.4 gigahertz (GHz) to 70 GHz.

According to a second aspect, there is provided a method for producing a multiband antenna apparatus. The method includes arranging a metasurface superstrate (MSS) structure in an area inside arms of a first dipole radiating element above a second radiating element. The first dipole radiating element is configured to operate at a first frequency band and is arranged on an upper plane of a support structure in a first distance to a reflector plate. The second radiating element is configured to operate at a second frequency band and is arranged on a lower plane of the support structure in a second distance to the reflector plate. The second distance is smaller than the first distance and the second frequency band is higher than the first frequency band.

The method for producing the multiband antenna apparatus increases directivity and gain of the second radiating element without lowering performance parameters such as gain, radiation pattern, bandwidth, etc. of the first dipole radiating element. The multiband antenna apparatus effectively utilizes, an area between the first dipole radiating element and the second radiating element. Further, the performance parameters of the first dipole radiating element are not degraded as the MSS structure is arranged in the area inside the arms of the first dipole radiating element. The MSS structure can be provided in multi-layers on the top and bottom side of the multiband antenna apparatus without affecting the weight or architecture of the multiband antenna apparatus. The MSS structure improves the directivity and the gain of the multiband antenna apparatus and enables the multiband antenna apparatus to work in multi-frequency bands. Design parameters of the multiband antenna apparatus such as inter-band isolation, sidelobe levels, a return-loss, and an intra-column coupling are improved by tuning a length, a width, a height, and a gap between unit cells of the MSS structure. An impedance of a surface of the MSS structure is also optimized by tuning the length, the width, the height, and the gap between the unit cells of the MSS structure. The multiband antenna apparatus with the MSS structure is advantageous due to its compact size. The multiband antenna apparatus is highly cost-effective.

A technical problem in the prior art is resolved, wherein the technical problem concerns improving directivity and gain of the multiband antenna apparatus without lowering the performance of the first dipole radiating element.

Therefore, in contradistinction to the prior art, according to the multiband antenna apparatus and the method for producing the multiband antenna apparatus provided in the present disclosure, the MSS structure are arranged in an area inside the arms of the first dipole radiating element, thereby increasing the directivity of the second radiating element without lowering performance parameters such as gain, radiation pattern, bandwidth, etc. of the first dipole radiating element. The performance parameters of the first dipole radiating element are not degraded due to the placement of the MSS structure. The multiband antenna apparatus improves the directivity and the gain of the multiband antenna apparatus and enables the multiband antenna apparatus to operate in a wide range of frequency bands. The multiband antenna apparatus is cost-effective and easy to implement.

These and other aspects of the disclosure will be apparent from and the embodiment(s) described below.

BRIEF DESCRIPTION OF DRAWINGS

Embodiments of the present disclosure will now be described, by way of example only, with reference to the following diagrams in which:

FIG. 5 is a flow diagram of a method for producing a multiband antenna apparatus in accordance with an embodiment of the present disclosure.

DETAILED DESCRIPTION

Embodiments of the present disclosure provide a multiband antenna apparatus and a method for producing the multiband antenna apparatus to achieve high directivity and high gain.

To make the solutions of the present disclosure more comprehensible for a person skilled in the art, the following embodiments of the present disclosure are described with reference to the accompanying drawings.

Terms such as “a first”, “a second”, “a third”, and “a fourth” (if any) in the summary, claims, and foregoing accompanying drawings of the present disclosure are used to distinguish between similar objects and are not necessarily used to describe a specific sequence or order. It should be understood that the terms so used are interchangeable under appropriate circumstances, so that the embodiments of the present disclosure described herein are, for example, capable of being implemented in sequences other than the sequences illustrated or described herein. Furthermore, the terms “include” and “have” and any variations thereof, are intended to cover a non-exclusive enclosure. For example, a process, a method, a system, a product, or a device that includes a series of steps or units, is not necessarily limited to expressly listed steps or units but may include other steps or units that are not expressly listed or that are inherent to such process, method, product, or device.

Figure 1:
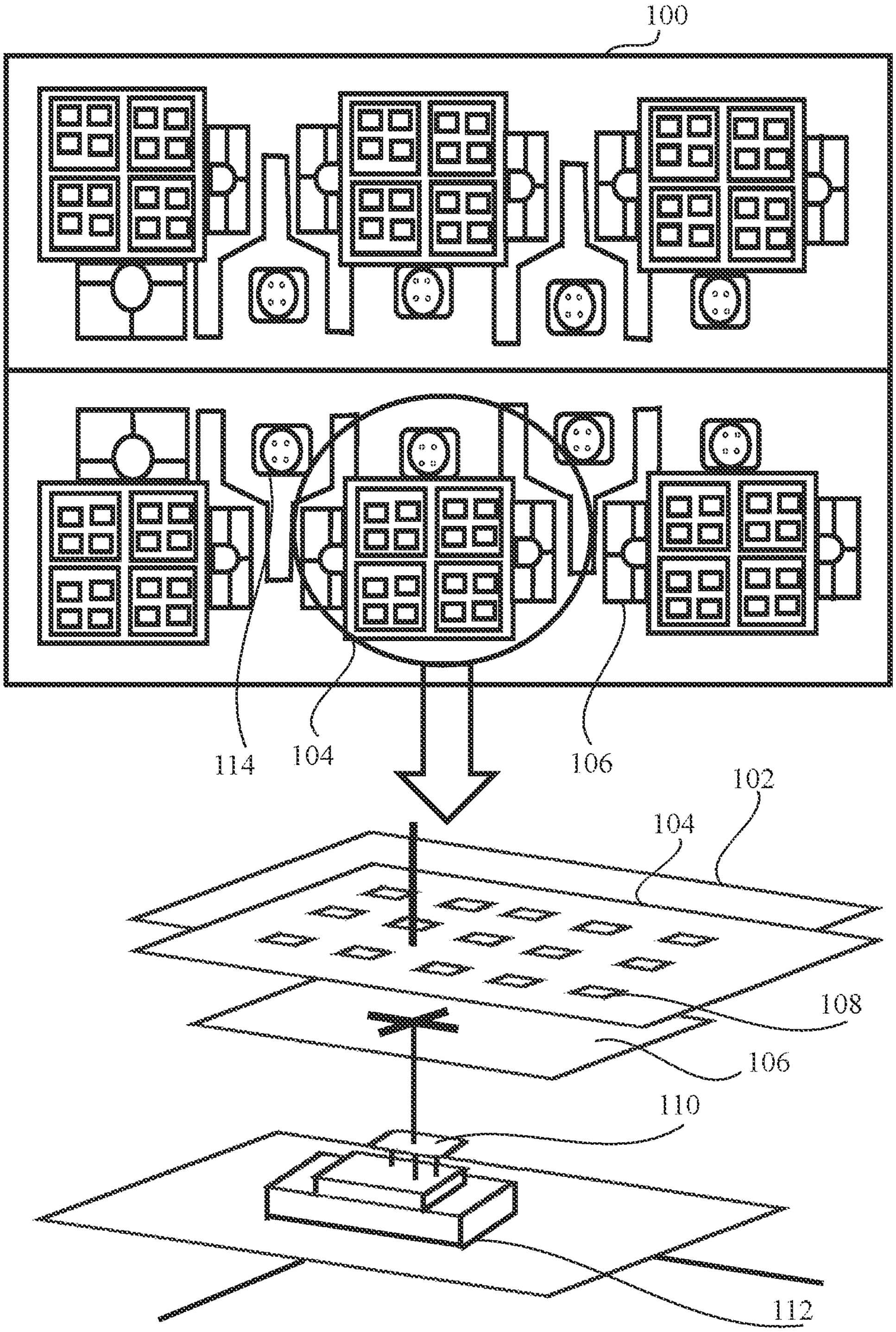
FIG. 1 is a schematic illustration of a multiband antenna apparatus in accordance with an embodiment of the present disclosure.

FIG. 1 is a schematic illustration of a multiband antenna apparatus 100 in accordance with an embodiment of the present disclosure. The multiband antenna apparatus 100 includes a first dipole radiating element 104, a second radiating element 106, a metasurface superstrate (MSS) structure 108, a reflector plate 110, a support structure 112, and a third radiating element 114. The first dipole radiating element 104 is configured to operate at a first frequency band and is arranged on an upper plane of the support structure 112 in a first distance to the reflector plate 110. For example, the first distance may be a quarter wavelength to a center frequency of the first frequency band (e.g. about 80 millimeters). The second radiating element 106 is configured to operate at a second frequency band. The second radiating element 106 is arranged on a lower plane of the support structure 112 in a second distance to the reflector plate 110. For example, the second distance may be a quarter wavelength to a center frequency of the second frequency band (e.g. about 40 millimeters). The second distance is smaller than the first distance, and the second frequency band is higher than the first frequency band. For example, the first frequency band corresponds to a low band (e.g. 618 to 960 MHz), and the second frequency band corresponds to a high band (e.g. 2.3 to 2.69 GHz). The MSS structure 108 is arranged in an area inside arms of the first dipole radiating element 104. The MSS structure 108 is configured to enhance a performance of the second radiating element 106.

The multiband antenna apparatus 100 may include a radome 102 that protects the multiband antenna apparatus 100 from severe weather conditions. The MSS structure 108 improves directivity and gain of the multiband antenna apparatus 100 without degrading performance parameters such as gain, radiation pattern, bandwidth, etc. of the first dipole radiating element 104.

Directivity is a measure of the concentration of the multiband antenna apparatus 100 radiation pattern in a particular direction. The gain of the multiband antenna apparatus 100 indicates how strong a signal that the multiband antenna apparatus 100 can send or receive in a specified direction. The multiband antenna apparatus 100 has a bandwidth that indicates a range of frequencies over which the multiband antenna apparatus 100 operates efficiently. The multiband antenna apparatus 100 has a radiation pattern that indicates receiving and transmitting properties of the multiband antenna apparatus 100 in different directions. The multiband antenna apparatus 100 has a compact design and is highly cost-effective. The MSS structure 108 that is arranged in the area inside the arms of the first dipole radiating element 104 increases the directivity of the second radiating element 106 without degrading the performance parameters (i.e. gain, radiation pattern, bandwidth, etc.) of the first dipole radiating element 104. Also, the multiband antenna apparatus 100 effectively utilizes an area between the first dipole radiating element 104 and the second radiating element 106. The first dipole radiating element 104 may be a low band radiator. The first dipole radiating element 104 may be operated at a lower frequency band, e.g. 618 to 960 MHz. The second radiating element 106 may be a high band radiator. The second radiating element 106 may be operated at a higher frequency band, e.g. 2.3 to 2.69 GHz.

According to a first embodiment, the MSS structure 108 is arranged on the upper plane of the support structure 112.

The arrangement of the MSS structure 108 on the upper plane utilizes the area of the arms of the first dipole radiating element 104 and an area between the first dipole radiating element 104 and the second radiating element 106 to improve the performance of the multiband antenna apparatus 100.

According to a second embodiment, the MSS structure 108 includes metallic patches of a square shape. The MSS structure 108 optionally includes metallic patches of a cross shape. A shape of the metallic patches can be varied to achieve an enhanced performance of the multiband antenna apparatus 100. The metallic patches of the MSS structure 108 are arranged in the area of the arms of the first dipole radiating element 104 to improve the performance of the multiband antenna apparatus 100.

According to a third embodiment, the MSS structure 108 includes multiple layers. The MSS structure 108 optionally includes a layer that is arranged on an upper surface of the upper plane of the support structure 112. The MSS structure 108 optionally includes a layer that is arranged on a lower surface of the lower plane of the support structure 112.

According to a fourth embodiment, the MSS structure 108 includes patches of different sizes in different areas inside the arms of the first dipole radiating element 104. The optimization of the patches of the different sizes of the MSS structure 108 may provide a multiband environment to the multiband antenna apparatus 100. The patches of the different sizes are optimized by arranging the MSS structure 108 in (i) the area inside the arms of the first dipole radiating element 104, and (ii) areas between the third radiating element 114, the first dipole radiating element 104, and the second radiating element 106, to improve the gain and directivity of the multiband antenna apparatus 100 over a wide range of frequency bands from lower frequencies to higher frequencies i.e. from 2.4 gigahertz (GHz) to 70 GHz.

Figure 2:
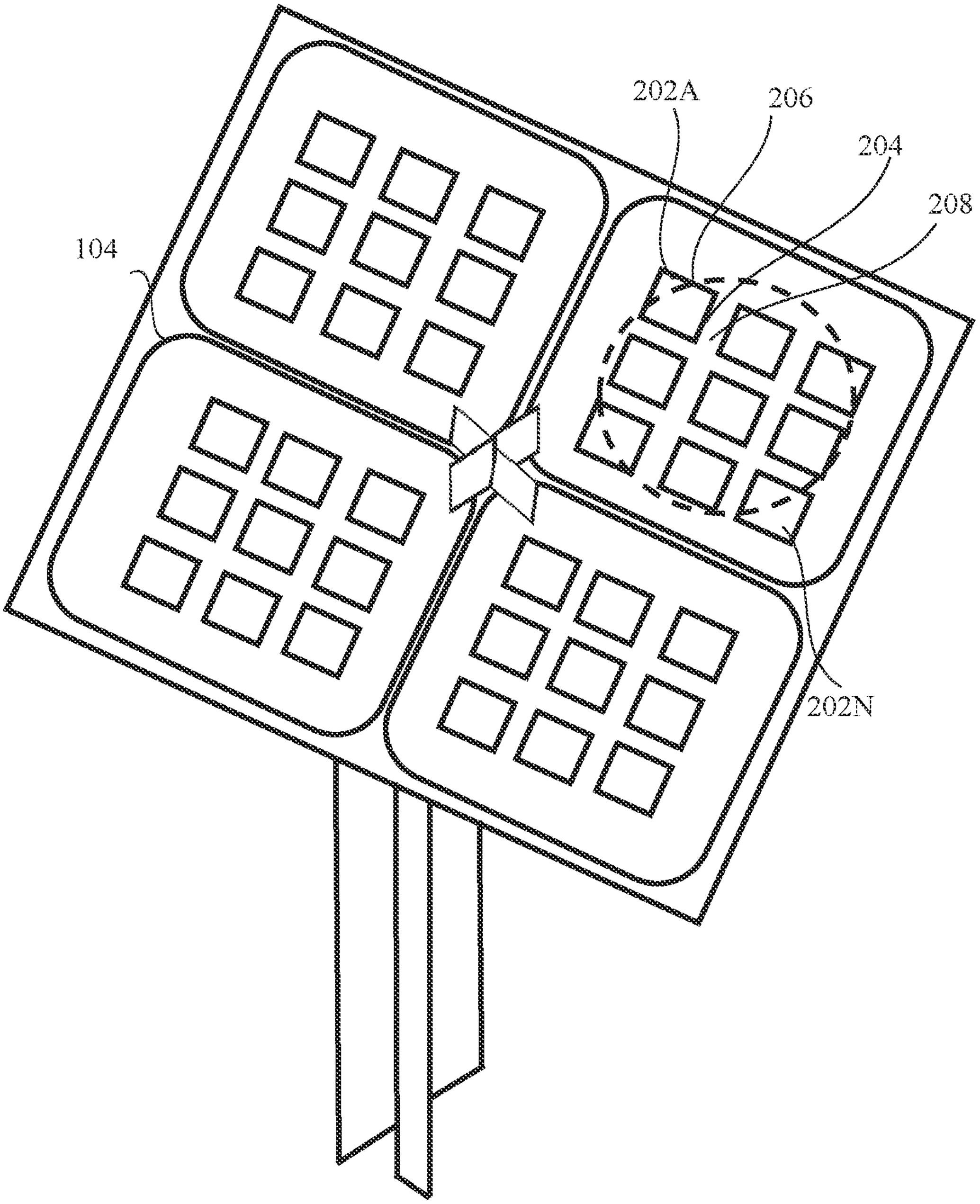
FIG. 2 is a schematic illustration of a first dipole radiating element of the multiband antenna apparatus of FIG. 1 in accordance with an embodiment of the present disclosure.

FIG. 2 is a schematic illustration of the first dipole radiating element 104 of the multiband antenna apparatus 100 of FIG. 1 in accordance with an embodiment of the present disclosure. The multiband antenna apparatus 100 includes the metallic superstrate (MSS) structure 108 that is arranged in an area inside arms of the first dipole radiating element 104. The MSS structure 108 includes one or more unit cells 202A-N. Each unit cell is tunable in terms of a length 204, a width 206, and a gap 208 between each unit cell. In an embodiment, design parameters of the multiband antenna apparatus 100 such as inter-band isolation, sidelobe levels, a return-loss, and an intra-column coupling are improved by tuning the length 204, the width 206, and the gap 208 between each unit cell of the MSS structure 108. In an embodiment, an impedance of a surface of the MSS structure 108 is optimized by tuning the length 204, the width 206, and the gap 208 between each unit cell of the MSS structure 108. In an embodiment, the directivity and the gain of the multiband antenna apparatus 100 are improved by adjusting a number of rows and a number of columns of the one or more unit cells 202A-N in the MSS structure 108. Each of the one or more unit cells 202A-N may include multiple layers. The one or more unit cells 202A-N may be arranged in the area inside the arms of the first dipole radiating element 104. By this arrangement, the area in the first dipole radiating element 104 is effectively utilized to increase the directivity of the multiband antenna apparatus 100. In an embodiment, the one or more unit cells 202A-N are customized based on an operating frequency of the multiband antenna apparatus 100.

The sidelobe level is a parameter used to describe a level of sidelobe suppression. The sidelobes represent radiation outside main beam sector. The return loss is defined as a figure that indicates a proportion of radio waves arriving at the input of the multiband antenna apparatus 100 that are rejected as a ratio against those that are accepted.

Figure 3:
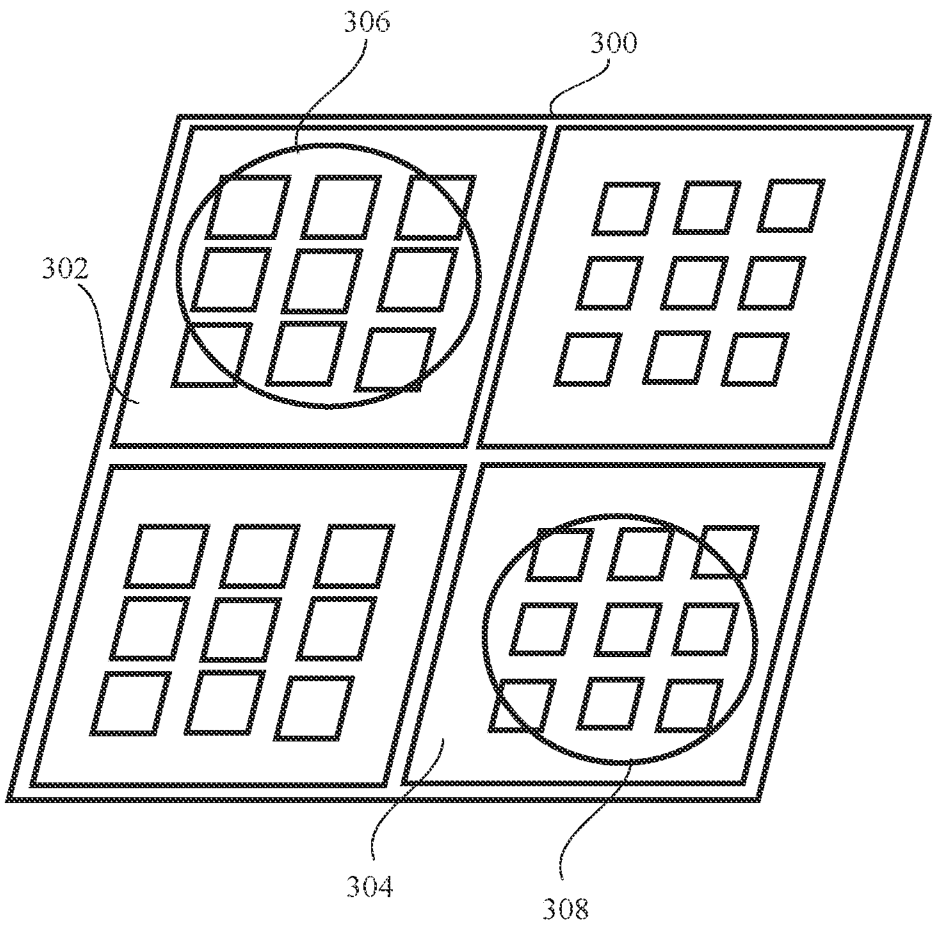
FIG. 3 is a schematic illustration of a multiband environment of a multiband antenna apparatus in accordance with an embodiment of the present disclosure.

FIG. 3 is a schematic illustration of a multiband environment of a multiband antenna apparatus 300 in accordance with an embodiment of the present disclosure. The multiband antenna apparatus 300 includes a second radiating element 302 and a third radiating element 304, a first MSS structure 306, and a second MSS structure 308. A shape of the first MSS structure 306 and a shape of the second MSS structure 308 is optionally optimized by arranging the first MSS structure 306 and the second MSS structure 308 in an area inside arms of a first dipole radiating element. In an embodiment, a size of the first MSS structure 306 is not the same as a size of the third radiating element 304. In another embodiment, metallic patches of the first MSS structure 306 and the second MSS structure 308 are uneven. The first MSS structure 306 is optionally arranged in an area of arms the first dipole radiating element or optionally arranged in areas between the third radiating element 304, the first dipole radiating element, and the second radiating element 302. In an embodiment, the second MSS structure 308 is arranged in the area in the arms of the first dipole radiating element or arranged in the areas between the third radiating element 304, the first dipole radiating element, and the second radiating element 302. The arrangement of the second radiating element 302 and the third radiating element 304 is optionally optimized by arranging the second radiating element 302 on one side of the first dipole radiating element and the third radiating element 304 on another side of the first dipole radiating element. The optimization of (i) the sizes of the first MSS structure 306 and the second MSS structure 308, (ii) the shape of the first MSS structure 306 and the shape of the second MSS structure 308, and (iii) the arrangement of the second radiating element 302 and the third radiating element 304 provide the multiband environment to the multiband antenna apparatus 300 to enable the multiband antenna apparatus 300 to operate in a wide range of frequency bands.

According to an embodiment, the third radiating element 304 is configured to operate at a third frequency band and is arranged in a third distance to a reflector plate. For example, the third distance may be a quarter wavelength to a center frequency of the third frequency band (e.g. about 25 millimeters). The third distance may be smaller than the second distance, and the third frequency band may be higher than the second frequency band. For example, the second frequency band corresponds to a high band (e.g. 2.3 to 2.69 GHz), and the third frequency band corresponds a Citizen band (C band) (e.g. 3.3 to 4.99 GHz). The third radiating element 304 may be a C band radiator. In an embodiment, the third radiating element 304 that is arranged below the first dipole radiating element acts as a resonance cavity. As a result, a phase of the reflection coefficient of the third radiating element 304 is at zero-degree phase with respect to the first dipole radiating element, which enables the first MSS structure 306 and the second MSS structure 308 radiate in-phase through the area of the arms of the first dipole radiating element. Due to the in-phase radiation from the first MSS structure 306 and the second MSS structure 308, a narrower beam is resulted for the second radiating element or the third radiating element 304. Thus, the directivity and the gain of the multiband antenna apparatus 300 are enhanced with the narrower beam. The reflection coefficient of any radiating element is defined as a ratio of the amplitude of a reflected wave to the amplitude of an incident wave. In an embodiment, the second radiating element 302 is configured to operate at the second frequency band. The second radiating element 302 may be a high band radiator.

Figure 4A:
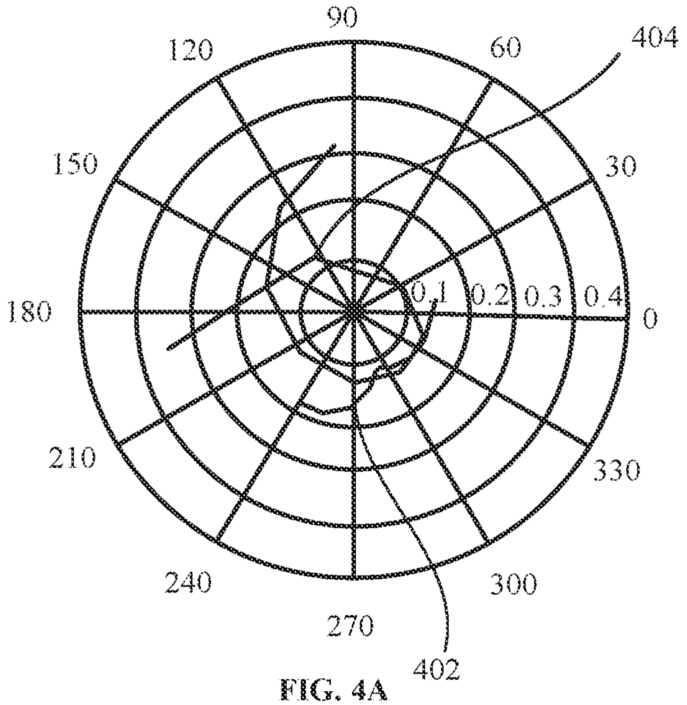
FIG. 4A illustrates an exemplary polar curve of s-parameters of the multiband antenna apparatus of FIG. 1 in accordance with an embodiment of the present disclosure.

FIG. 4A illustrates an exemplary polar curve of s-parameters of the multiband antenna apparatus 100 of FIG. 1 in accordance with an embodiment of the present disclosure. The exemplary polar curve depicts the s-parameters of input ports $S_{11}$, and $S_{21}$ (not shown in FIG. 4A) of the multiband antenna apparatus 100 at a first curve 402, and a second curve 404 respectively. A return loss of the input ports $S_{11}$, and $S_{21}$ in the exemplary polar curve is within an acceptable range of 0.1 decibels (dB) to 0.2 dB, which shows that there is a match between the MSS structure 108 and the first dipole radiating element 104 when the MSS structure 108 is introduced in an area of the arms of the first dipole radiating element 104. Hence, no tuning is required after the introduction of the MSS structure 108.

Figure 4B:
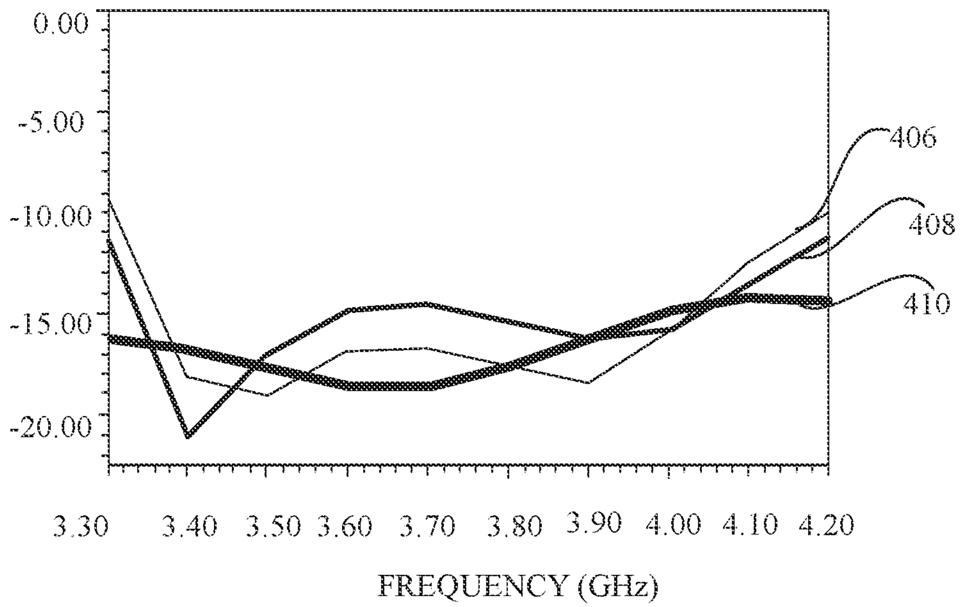
FIG. 4B is an exemplary rectangular plot of s-parameters of the multiband antenna apparatus of FIG. 1 in accordance with an embodiment of the present disclosure.

FIG. 4B is an exemplary rectangular plot of s-parameters of the multiband antenna apparatus 100 of FIG. 1 in accordance with an embodiment of the present disclosure. The exemplary rectangular plot depicts the s-parameters of input ports $S_{11}$, $S_{12}$, $S_{22}$ (not shown in FIG. 4B) of the multiband antenna apparatus 100 at a first curve 406, a second curve 408, and a third curve 410 for the third radiating element 114. The rectangular plot of s-parameters depicts power transferred between two ports of the third radiating element 114 of the multiband antenna apparatus 100 on a Y-axis against frequency on an X-axis. In an example embodiment, the frequency ranges from 3 Giga Hertz (GHz) to 4 Giga Hertz (GHz) on the multiband antenna apparatus 100. The exemplary polar curve of FIG. 4A and the exemplary rectangular plot of FIG. 4B are coherent with each other. The rectangular plot of s-parameters depicts a match of polarizations of the multiband antenna apparatus 100 is below 15 decibels (dB) and hence a return loss of the input ports $S_{11}$, $S_{12}$, $S_{22}$ in the exemplary rectangular plot is not affected. Hence, there is a match between the MSS structure 108 and the first dipole radiating element 104 when the MSS structure 108 is introduced in an area of the arms of the first dipole radiating element 104.

Figure 4C:
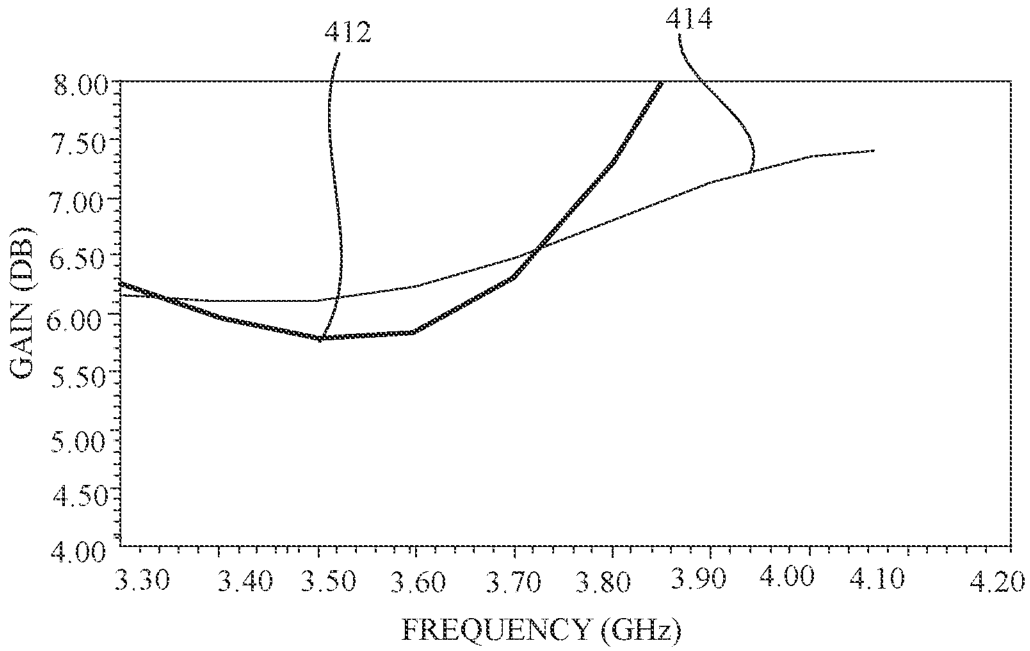
FIG. 4C is a graphical illustration that illustrates an exemplary gain plot of the multiband antenna apparatus of FIG. 1 in accordance with an embodiment of the present disclosure.

FIG. 4C is a graphical illustration that illustrates an exemplary gain plot of the multiband antenna apparatus 100 of FIG. 1 in accordance with an embodiment of the present disclosure. The graphical illustration of the exemplary gain plot depicts gain of the multiband antenna apparatus 100 on a Y-axis against frequency on an X-axis. The graphical illustration of the exemplary gain plot depicts that the third radiating element 114 has high gain if the first dipole radiating element 104 includes the MSS structure 108 as shown in a gain plot 412. The graphical illustration of the exemplary gain plot depicts that the third radiating element 114 has low gain if the first dipole radiating element 104 does not include the MSS structure 108 as shown in a gain plot 414. The MSS structure 108 in the first dipole radiating element 104 narrows beamwidth of the third radiating element 114 and thus improves the gain of the third radiating element 114.

Figure 4D:
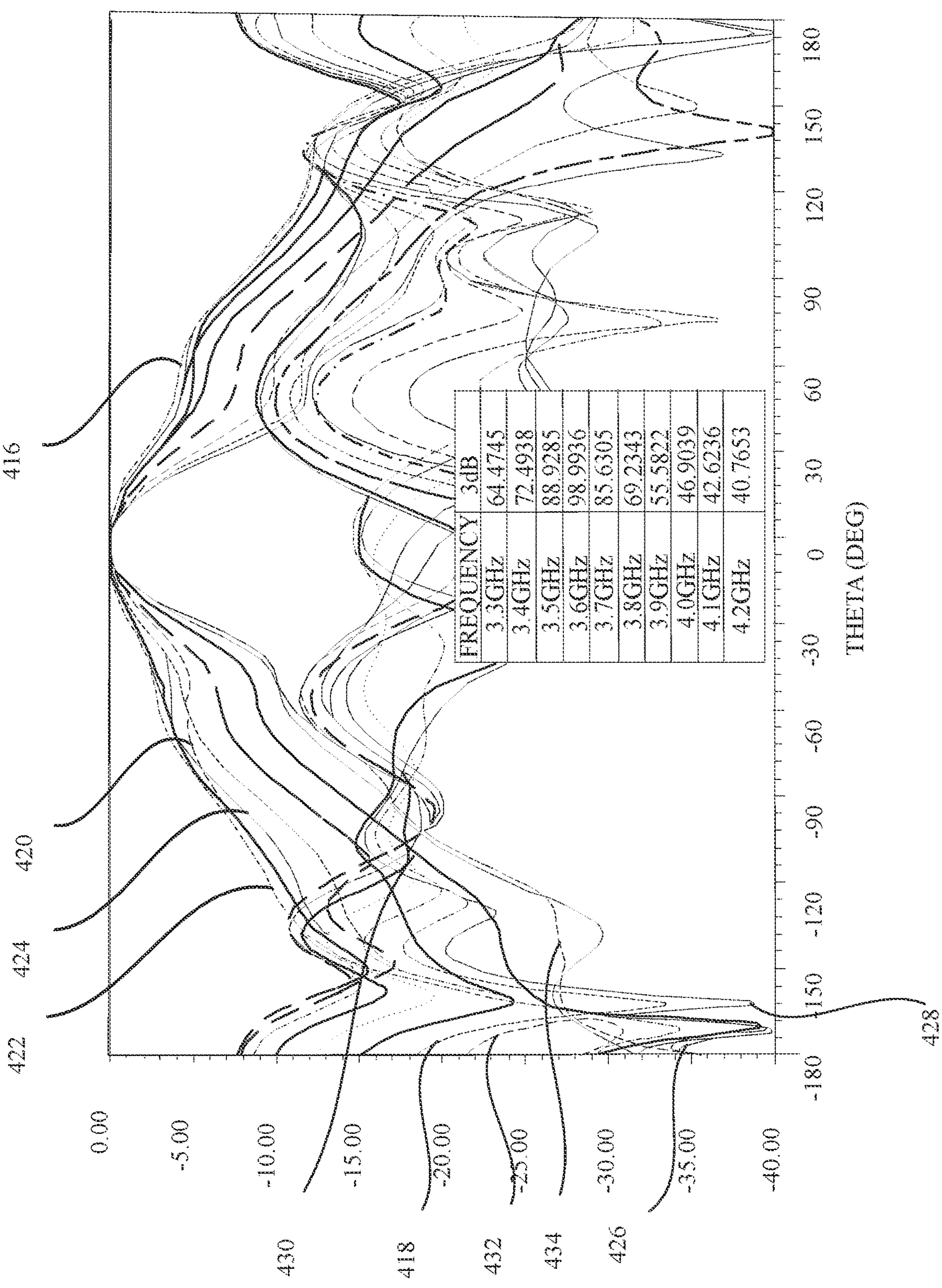
FIG. 4D is a graphical illustration that illustrates exemplary radiation patterns of the multiband antenna apparatus of FIG. 1 at different frequencies in accordance with an embodiment of the present disclosure.

FIG. 4D is a graphical illustration that illustrates exemplary radiation patterns of the multiband antenna apparatus 100 of FIG. 1 at different frequencies in accordance with an embodiment of the present disclosure. In the multiband antenna apparatus 100, for each frequency of operation, a radiation pattern is obtained. For example, a frequency of operation of 3.3 gigahertz (GHz) for a Phi of −45 degrees, at a gain of 64.47 decibels (dB), outputs a first radiation pattern 416 as shown in FIG. 4D. The frequency of operation of 3.4 GHz, for a Phi of −45 degrees, at a gain of 72.49 dB, outputs a second radiation pattern 418. The frequency of operation of 3.5 GHz, for a Phi of −45 degrees, at a gain of 88.92 dB, outputs a third radiation pattern 420. The frequency of operation of 3.6 GHz, for a Phi of −45 degrees, at a gain of 98.99 dB, outputs a fourth radiation pattern 422. The frequency of operation of 3.7 GHz, for a Phi of −45 degrees, at a gain of 69.23 dB outputs a fifth radiation pattern 424. The frequency of operation of 3.8 GHz for a Phi of −45 degrees, at a gain of 69.23 dB, outputs a sixth radiation pattern 426. The frequency of operation of 3.9 GHz, for a Phi of −45 degrees, at a gain of 55.58 dB, outputs a seventh radiation pattern 428. The frequency of operation of 4.0 GHz for a Phi of −45 degrees, at a gain of 42.62 dB, outputs an eighth radiation pattern 430. The frequency of operation of 4.1 GHz, for a Phi of −45 degrees, at a gain of 42.62 dB, outputs a ninth radiation pattern 432. The frequency of operation of 4.2 GHz, for a Phi of −45 degrees, at a gain of 40.76 dB, outputs a tenth radiation pattern 434.

FIG. 5 is a flow diagram of a method for producing a multiband antenna apparatus in accordance with an embodiment of the present disclosure. At a step 502, the multiband antenna apparatus is produced by arranging a metasurface superstrate (MSS) structure in an area inside arms of a first dipole radiating element configured to operate at a first frequency band and arranged on an upper plane of a support structure in a first distance to a reflector plate, above a second radiating element configured to operate at a second frequency band and arranged on a lower plane of the support structure in a second distance to the reflector plate. The second distance being smaller than the first distance, and the second frequency band is higher than the first frequency band.

Although the present disclosure and its advantages have been described in detail, it should be understood that various changes, substitutions and alterations can be made herein without departing from the spirit and scope of the disclosure as defined by the appended claims.

What is claimed is:

1. A multiband antenna apparatus, comprising:

a first dipole radiating element configured to operate at a first frequency band and arranged at a first distance to a reflector plate, a second radiating element configured to operate at a second frequency band and arranged at a second distance to the reflector plate, the second distance being smaller than the first distance, and the second frequency band being higher than the first frequency band, a third radiating element configured to operate at a third frequency band higher than the second frequency band, the third radiating element being arranged at a third distance to the reflector plate, and the third distance being smaller than the second distance, and a metasurface superstrate (MSS) structure arranged in an area inside arms of the first dipole radiating element, the MSS structure being configured to enhance performance of the second radiating element and the third radiating element.

2. The multiband antenna apparatus according to claim 1, wherein the MSS structure comprises at least one layer arranged away from the reflector plate.

3. The multiband antenna apparatus according to claim 1, wherein the MSS structure comprises metallic patches of a square shape.

4. The multiband antenna apparatus according to claim 1, wherein the MSS structure comprises metallic patches of a cross shape.

5. The multiband antenna apparatus according to claim 1, wherein the MSS structure comprises multiple layers.

6. The multiband antenna apparatus according to claim 5, wherein the MSS structure comprises a layer arranged at the first distance to the reflector plate.

7. The multiband antenna apparatus according to claim 5, wherein the MSS structure comprises a layer arranged at the second distance to the reflector plate.

8. The multiband antenna apparatus according to claim 1, wherein the MSS structure comprises patches of different sizes in different areas inside the arms of the first dipole radiating element.

9. A method of producing a multiband antenna apparatus, comprising:

arranging a metasurface superstrate (MSS) structure in an area inside arms of a first dipole radiating element configured to operate at a first frequency band and arranged at a first distance to a reflector plate, above a second radiating element configured to operate at a second frequency band and arranged at a second distance to the reflector plate, the second distance being smaller than the first distance, and the second frequency band being higher than the first frequency band, wherein the multiband antenna apparatus comprises a third radiating element configured to operate at a third frequency band higher than the second frequency band, the third radiating element is arranged in a third distance to the reflector plate, the third distance is smaller than the second distance, and the MSS structure is configured to enhance performance of the third radiating element.

10. The method according to claim 9, wherein the MSS structure comprises at least one layer arranged away from the reflector plate.

11. The method according to claim 9, wherein the MSS structure comprises metallic patches of a square shape.

12. The method according to claim 9, wherein the MSS structure comprises metallic patches of a cross shape.

13. The method according to claim 9, wherein the MSS structure comprises multiple layers.

14. The method according to claim 13, wherein the MSS structure comprises a layer arranged at the first distance to the reflector plate.

15. The method according to claim 13, wherein the MSS structure comprises a layer arranged at the second distance to the reflector plate.

16. The method according to claim 9, wherein the MSS structure comprises patches of different sizes in different areas inside the arms of the first dipole radiating element.

17. A network device, comprising a multiband antenna apparatus, wherein the multiband antenna apparatus comprises:

a first dipole radiating element configured to operate at a first frequency band and arranged at a first distance to a reflector plate, a second radiating element configured to operate at a second frequency band and arranged on at a second distance to the reflector plate, the second distance being smaller than the first distance, and the second frequency band being higher than the first frequency band, a third radiating element configured to operate at a third frequency band higher than the second frequency band, the third radiating element being arranged at a third distance to the reflector plate, and the third distance being smaller than the second distance, and a metasurface superstrate (MSS) structure arranged in an area inside arms of the first dipole radiating element, the MSS structure being configured to enhance performance of the second radiating element and the third radiating element.

18. The network device according to claim 17, wherein the network device is a base station.

19. The network device according to claim 17, wherein the MSS structure comprises at least one layer arranged away from the reflector plate.

20. The network device according to claim 17, wherein the MSS structure comprises metallic patches of a square shape.

* * * * *